United States Patent
Kudo et al.

(10) Patent No.: US 7,054,106 B2
(45) Date of Patent: May 30, 2006

(54) MAGNETIC HEAD AND MAGNETIC STORAGE APPARATUS

(75) Inventors: Kazue Kudo, Odawara (JP); Yoshiaki Kawato, Tokyo (JP); Kazuhiro Nakamoto, Odawara (JP); Nobuo Yoshida, Odawara (JP); Kimitoshi Etoh, Odawara (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 162 days.

(21) Appl. No.: 10/354,989

(22) Filed: Jan. 31, 2003

(65) Prior Publication Data
US 2004/0037002 A1 Feb. 26, 2004

(30) Foreign Application Priority Data
Aug. 26, 2002 (JP) ............................. 2002-244472

(51) Int. Cl.
*G11B 5/147* (2006.01)
(52) U.S. Cl. ...................................................... 360/126
(58) Field of Classification Search ................ 360/125, 360/126
See application file for complete search history.

(56) References Cited

U.S. PATENT DOCUMENTS

| 6,513,228 B1 * | 2/2003 | Khizroev et al. ........... 360/126 |
| 6,687,085 B1 * | 2/2004 | Minor et al. ................. 360/126 |
| 6,791,793 B1 * | 9/2004 | Chen et al. .................. 360/126 |
| 6,791,796 B1 * | 9/2004 | Shukh et al. ................ 360/126 |

FOREIGN PATENT DOCUMENTS

JP 2000-276707 3/1999

* cited by examiner

*Primary Examiner*—Robert S. Tupper
(74) *Attorney, Agent, or Firm*—Reed Smith LLP; Stanley P. Fisher, Esq.; Juan Carlos A. Marquez, Esq.

(57) ABSTRACT

Disclosed herein is a magnetic head for perpendicular recording in which the main magnetic pole has reduced remanent magnetization and is less liable to cause erasure after recording. These characteristic properties were realized by constructing the magnetic head such that the recording magnetic pole and the yoke are separate from each other and the main magnetic pole is formed from a material with a high saturation magnetic flux density and the yoke is formed from a material having a negative magnetostriction constant.

18 Claims, 9 Drawing Sheets

AIR BEARING SURFACE

PROGRESS DIVECTION OF MAGNETIC MEDIA

A RESIST FRAME IS PREPARED

PLATING

REMOVE RESIST
ION MILLING

MAIN POLE IS FINISHED

YOKE LAYER IS PREPARED

AIR BEARING SURFACE

PROGRESS DIVECTION OF MAGNETIC MEDIA

PROGRESS DIVECTION OF MAGNETIC MEDIA

PROGRESS DIVECTION OF MAGNETIC MEDIA

MAGNETIC HEAD AND MAGNETIC STORAGE APPARATUS

BACKGROUND OF THE INVENTION

1. Field of the Invention

The present invention relates to a magnetic head and a magnetic storage apparatus for perpendicular magnetic recording.

2. Description of Related Art

There has been an increasing demand for larger capacity and smaller size on the hard disc drive used as external storage for information processing apparatus such as computers. This demand has been met mainly by increasing the recording density of a hard disc. The disadvantage of increasing the recording density in conventional longitudinal recording is that it is necessary to reduce the thickness of the recording layer because the demagnetizing field reaches a maximum in the written magnetization transition region on the recording medium. The result is that recorded data disappear due to thermal scattering. By contrast, it is comparatively easy to increase the recording density for perpendicular recording (in which magnetization for recording takes place in the thickness direction of the recording medium) because the demagnetizing field reaches a minimum in the written magnetization transition region and this alleviates the necessity of reducing the thickness of the recording medium.

Recording signals on a perpendicular recording medium with a magnetic head for perpendicular recoding involves conversion by a coil of electric signals into magnetic signals, which produce a magnetic flux in the secondary magnetic pole and the recording magnetic pole. The magnetic flux passes through the secondary magnetic pole and the recording magnetic pole and penetrates the perpendicular recording layer. The magnetic flux further passes through the soft magnetic underlayer (below the perpendicular recording layer) and returns to the secondary magnetic pole, thereby forming a closed loop. The secondary magnetic pole serves to return the magnetic field (which has occurred in the perpendicular recording layer and the soft magnetic underlayer) from the recording pole to the recording pole again in a magnetically effective way. The flow of a magnetic flux in this way performs signal recording in terms of magnetization on a perpendicular recording medium.

The magnetic head used for conventional longitudinal recording requires that the upper magnetic core and the lower magnetic core should be as close to each other as possible, with a recording gap interposed between them. For a narrow track to be formed on the step containing the coil etc., it is necessary to form the tip and the yoke separately (separate structure), as mentioned in JP-A No. 276707/2000. This is not the case for the magnetic head for perpendicular magnetic recording, which does not necessarily need the separate structure because the main magnetic pole can be formed on a flat surface.

An increase in recording density entails a reduction in track width, and these results in a decrease in the magnetic field generated by the magnetic pole. This in turn makes it necessary to form the recording magnetic pole from a material having a high saturation magnetic flux density. However, because of its large magnetostriction, such a material is not favorable to the conventional main magnetic pole elongating in the depthwise direction from the flying surface. Such a magnetic pole causes magnetization to orient in the direction of the flying surface even when no current is flowing through the coil. (This phenomenon is called remanent magnetization.) The magnetic head with remanent magnetization causes so-called "erasure after recording", which is a phenomenon that signals written on a recording medium are erased while the head is not performing recording.

SUMMARY OF THE INVENTION

The present invention was completed in view of the foregoing. It is an object of the present invention to provide a magnetic head for perpendicular magnetic recording which prevents "erasure after recording" and has a magnetic field strength and a magnetic field distribution both suitable for the narrow track width.

The gist of the present invention resides in a magnetic head of the type having a recording magnetic pole, a secondary magnetic pole magnetically coupled with said recording magnetic pole, and a coil to excite said recording magnetic pole, wherein said recording magnetic pole comprises a main magnetic pole and a yoke extending in the track width direction and contains a material having a higher saturation magnetic flux density than said yoke, and said main magnetic pole and said yoke respectively have a positive and a negative magnetostriction constant. It is desirable that the main magnetic pole should have a positive magnetostriction constant and the yoke should have a negative magnetostriction constant.

According to the present invention, the recording magnetic pole consists of the main magnetic pole which is short in the direction of the flying surface and the yoke which is wider in the track width direction than the main magnetic pole. This separate structure prevents the magnetic pole from magnetizing in the direction of the flying surface unlike the conventional one which elongates in the depthwise direction from the flying surface. In addition, the main magnetic pole is made of a material having a positive magnetostriction constant and a high saturation magnetic flux density. The yoke is made of a material having a negative magnetostriction constant, so that it causes the main magnetic pole to magnetize in the direction parallel to the surface of the recording medium and prevents erasure after recording.

According to the present invention, the main magnetic pole should be patterned as follows so that it increases in the recording magnetic field strength without causing erasure after recording.

(1) The main magnetic pole expands in the track width direction, starting at a position which is closer to the flying surface of the yoke than the side end of the flying surface of the yoke.

(2) The tip of the main magnetic pole has a rectangular shape elongating in the track width direction as defined by $L_y \leq T_w$, where $L_y$ denotes the distance from the position closest to the flying surface to the flying surface, said position being measured at a position from which the main magnetic pole expands in the track width direction, and $T_w$ denotes the length in the track width direction of the main magnetic pole on the flying surface.

(3) The main magnetic pole has an average film thickness ($t_1$) such that $L_y \leq t_1$.

DETAILED DESCRIPTION OF THE PREFERRED EMBODIMENTS

The embodiments of the present invention will be described below with reference to the accompanying drawings.

EXAMPLE 1

Figure 1:
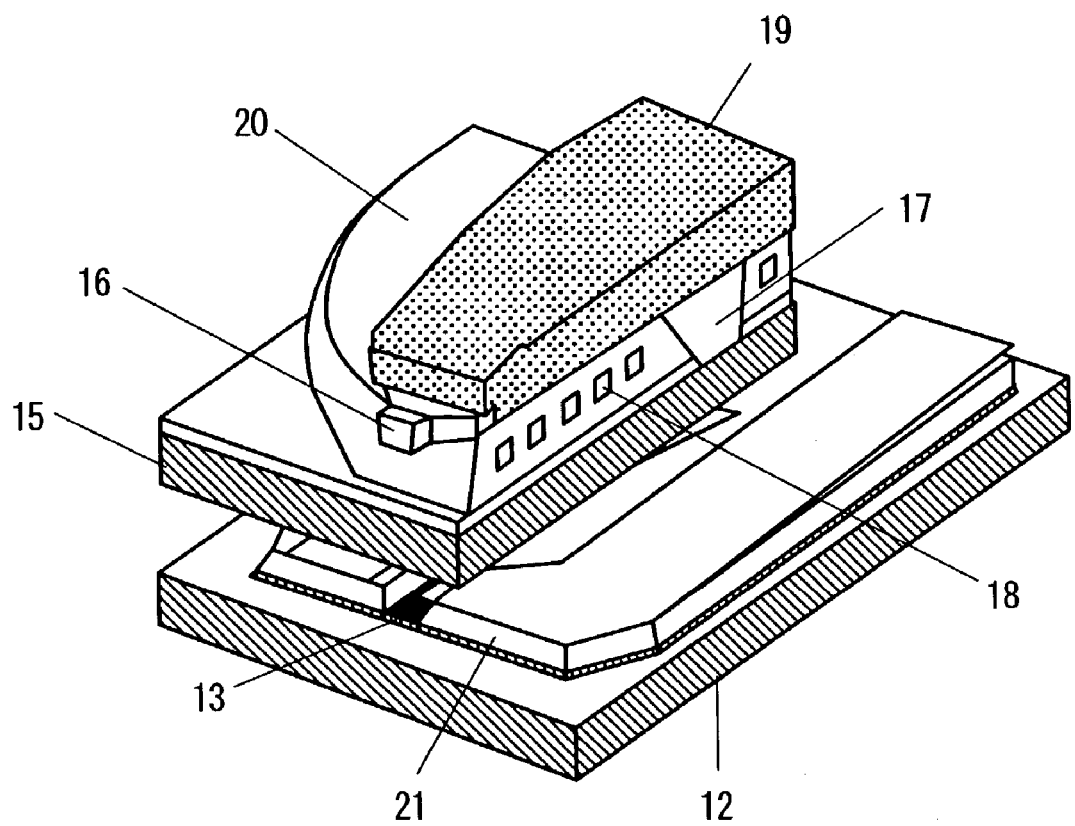
FIG. 1 is a schematic diagram showing the magnetic head according to the present invention.
Figure 2:
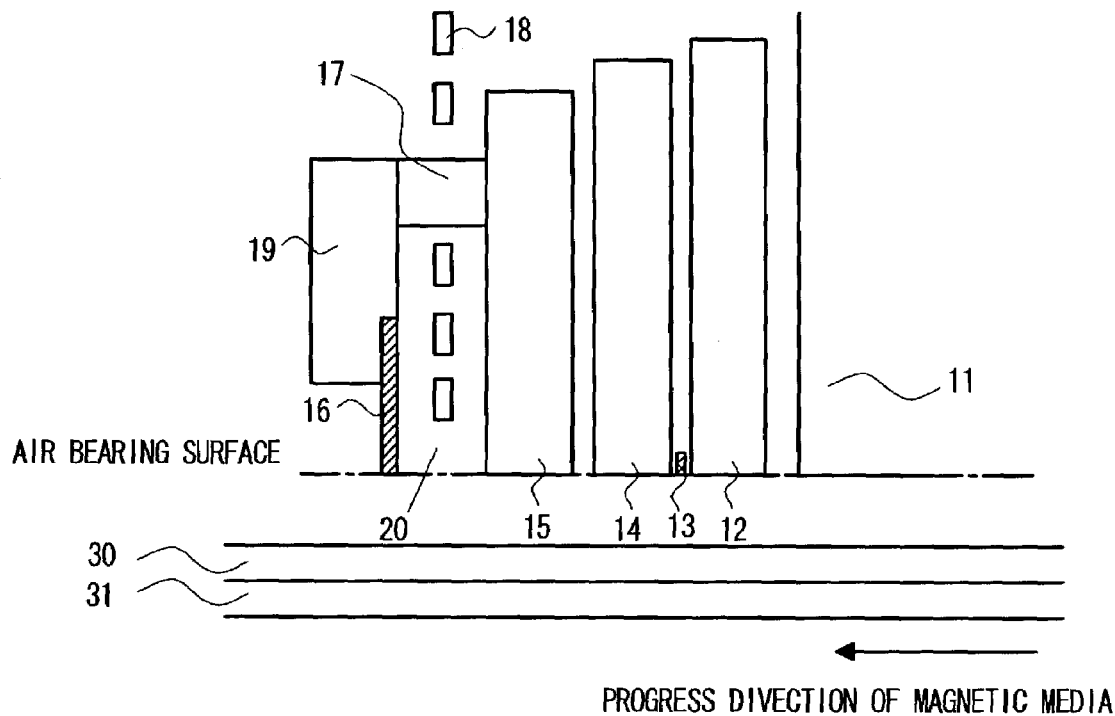
FIG. 2 is a sectional view of the magnetic head according to the present invention.
Figure 3:
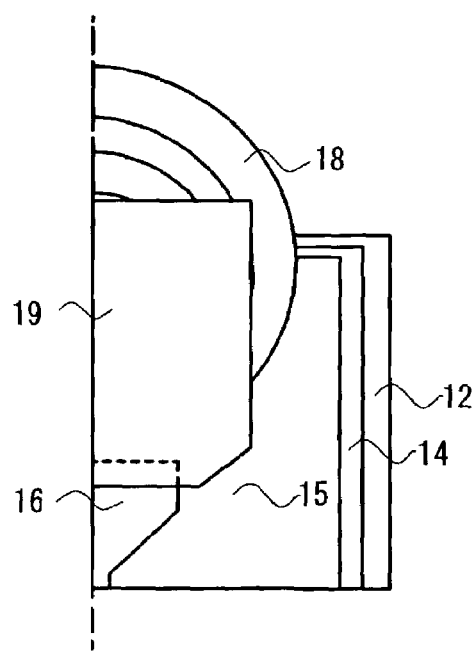
FIG. 3 is a schematic diagram showing the magnetic head according to the present invention.

This example demonstrates the magnetic head for perpendicular recording (to be simply referred to as the magnetic head hereinafter) whose structure is shown in FIGS. 1 to 3. FIG. 1 is a sectional perspective view of the magnetic head in which the recording head and the reproducing head are separated from each other, with the recording head being the perpendicular head manufactured according to the present invention. FIG. 2 is a sectional view perpendicular to the air bearing surface and the substrate surface. FIG. 3 is a plan view showing the structure of the magnetic head (right half). This plan view is parallel to the air bearing surface and the substrate surface.

In FIGS. 1 to 3, there are shown a substrate 11, a lower shield 13, a magnetoresistive film 13, an upper shield 14, a secondary magnetic pole 15, a main magnetic pole 16, a back yoke 17, a coil 18, and a yoke 19 attached to the main magnetic pole. Thus, the magnetic head in this example is constructed such that the main magnetic pole is positioned at the leading side of the yoke. Incidentally, the reference numbers 30 and 31 denote a perpendicular recording layer and a soft magnetic underlayer, respectively. The yoke is made of $Ni_{85}Fe_{15}$ which has a negative magnetostriction constant of $-10 \times 10^{-7}$. The main magnetic pole is made of CoNiFe which has a positive magnetostriction constant and a saturation magnetic flux density ($B_s$) of 2.2 T.

The magnetic head in this example has a reproducing unit which is composed of a lower shield 12, a magneto-resistive film 13, and an upper shield 14. To the both sides of the magnetoresistive film 13 are connected a magnetic domain control layer and an electrode (which are not shown). The magnetoresistive film 13 may be that of AMR (anisotropic magnetoresistive) or GMR (giant magnetoresistive). On the surface facing the recording medium is formed a protective film (which is not shown). After the upper shield 14 has been formed, the secondary magnetic pole is formed, with an alumina film (as a gap film) interposed between them.

The yoke 19 should be made of a magnetic material having a negative magnetostriction constant so that leakage of residual magnetic field is effectively reduced. Although the yoke is made of $Ni_{85}Fe_{15}$ in this example, the NiFe alloy having a negative magnetostriction constant may vary in composition as represented by $Ni_{(78+x)}Fe_{(22-x)}$ {x=0–22}. A preferable material of the yoke is one whose composition is represented as $Ni_{(78+x)}Fe_{(22-x)}$ {x=0–22}.

Figure 5A:
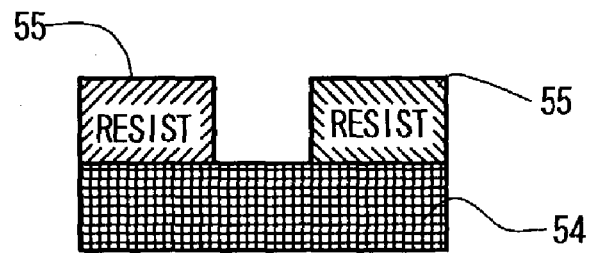
FIG. 5A is a schematic diagram showing the process for producing the main magnetic pole of the magnetic head according to the present invention.
Figure 5B:
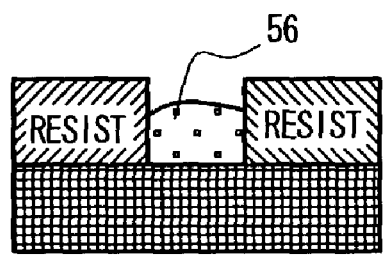
FIG. 5B is a schematic diagram showing the process for producing the main magnetic pole of the magnetic head according to the present invention.
Figure 5C:
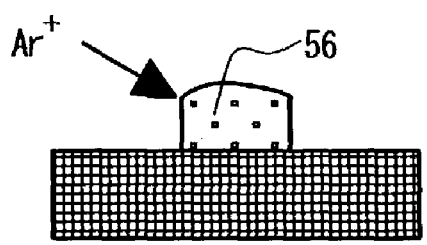
FIG. 5C is a schematic diagram showing the process for producing the main magnetic pole of the magnetic head according to the present invention.
Figure 5D:
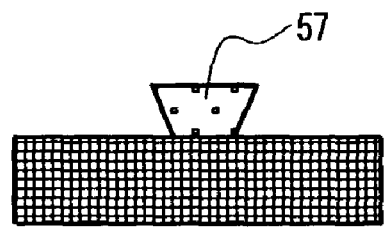
FIG. 5D is a schematic diagram showing the process for producing the main magnetic pole of the magnetic head according to the present invention.

The main magnetic pole of the magnetic head in this example is formed by the process schematically shown in FIGS. 5A to 5E (with different magnifications for each part). FIG. 5A shows the step in which the resist frame pattern 55 has been formed on the non-magnetic film 54. (In this example, the non-magnetic film 54 is made of Ta; however, Ta may be replaced by any other material such as $SiO_2$.) The resist pattern was exposed by using a KrF excimer laser stepper. This exposure achieves a resolution of 0.2 µm if the resist film is 1 µm thick. FIG. 5B shows the step in which the magnetic film 56 has been formed by plating through the resist film frame. The material for the magnetic film 56 is CoNiFe having a $B_s$ of 2.2 T. FIG. 5C shows the step in which the resist has been removed by etching. FIG. 5D shows the step in which the main magnetic pole (having an inversely tapered shape) has been formed by ion milling at 45 degrees and 75 degrees for 10 minutes each. The track width that can be attained is smaller than 150 nm.

Figure 5E:
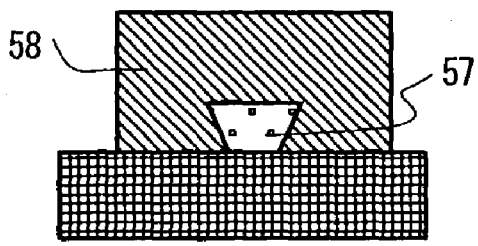
FIG. 5E is a schematic diagram showing the process for producing the main magnetic pole of the magnetic head according to the present invention.

Incidentally, although the main magnetic pole is formed by plating in this example, it may also be formed by patterning (by ion milling) a sputtered film. The main magnetic pole 16 formed in this manner has a part which continuously increases in width (in the track width direction) from the air bearing surface. The tip is covered with an alumina film for protection. Then, a plating underlayer is formed by sputtering, and a resist frame is formed. FIG. 5E shows the step in which the yoke 58 (which is a 1.5 µm thick film of $Ni_{85}Fe_{15}$ having a magnetostriction constant of $-10 \times 10^{-7}$) has been formed by electroplating. Thus the yoke has a controlled magnetostriction constant.

The main magnetic pole formed in this manner has a part which increases in width in the track width direction. The position of such a part is closer to the flying surface than the side of the flying surface of the yoke.

Figure 4:
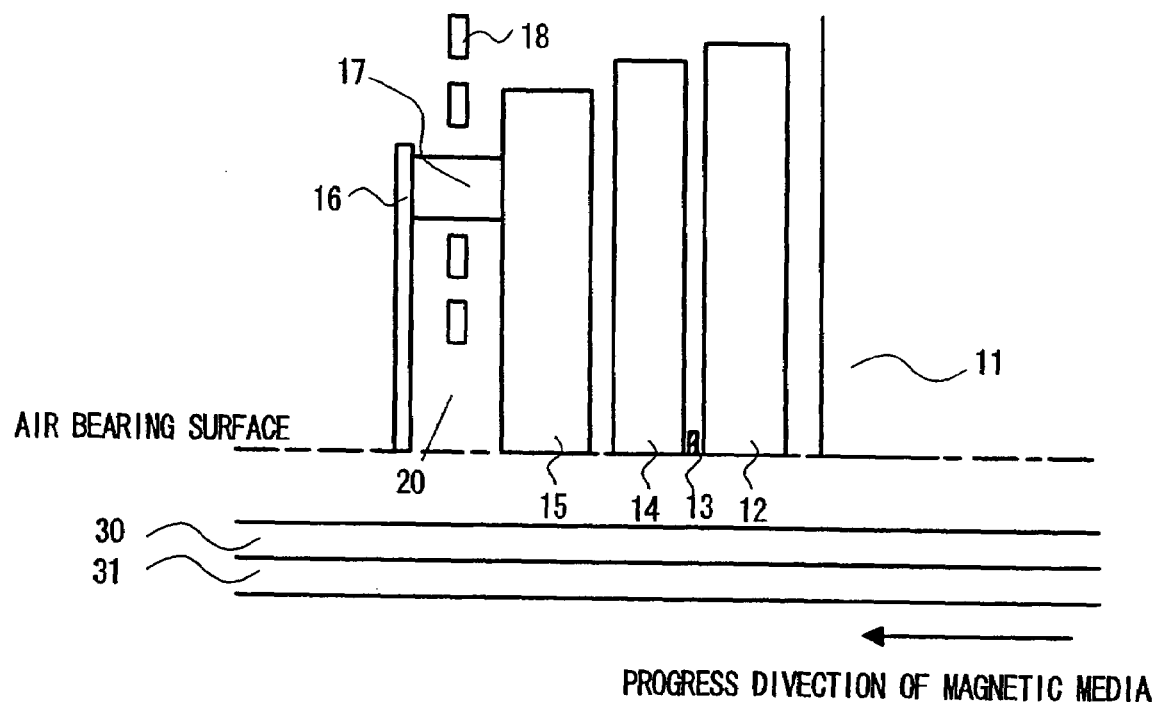
FIG. 4 is a sectional view of a conventional magnetic head.

For the purpose of comparison, a magnetic head of conventional structure was formed and examined for its performance. Its sectional view (perpendicular to the air bearing surface and the substrate surface) is shown in FIG. 4. It is constructed such that the recording pole consists only of one layer which extends to the back yoke.

For the purpose of another comparison, a magnetic head was formed which is identical in structure with that shown in FIG. 2 and has the main magnetic pole and yoke made of materials having the same magnetostriction constant. The magnetic head was examined for its performance.

The result was that the remanent magnetization of the magnetic head was 6500 Oe and 2500 Oe respectively in the first and second samples. It is to be noted that the remanent magnetization of the magnetic head according to the present invention was 1500 Oe (which is one-fourth of that in the first sample).

EXAMPLE 2

Figure 6:
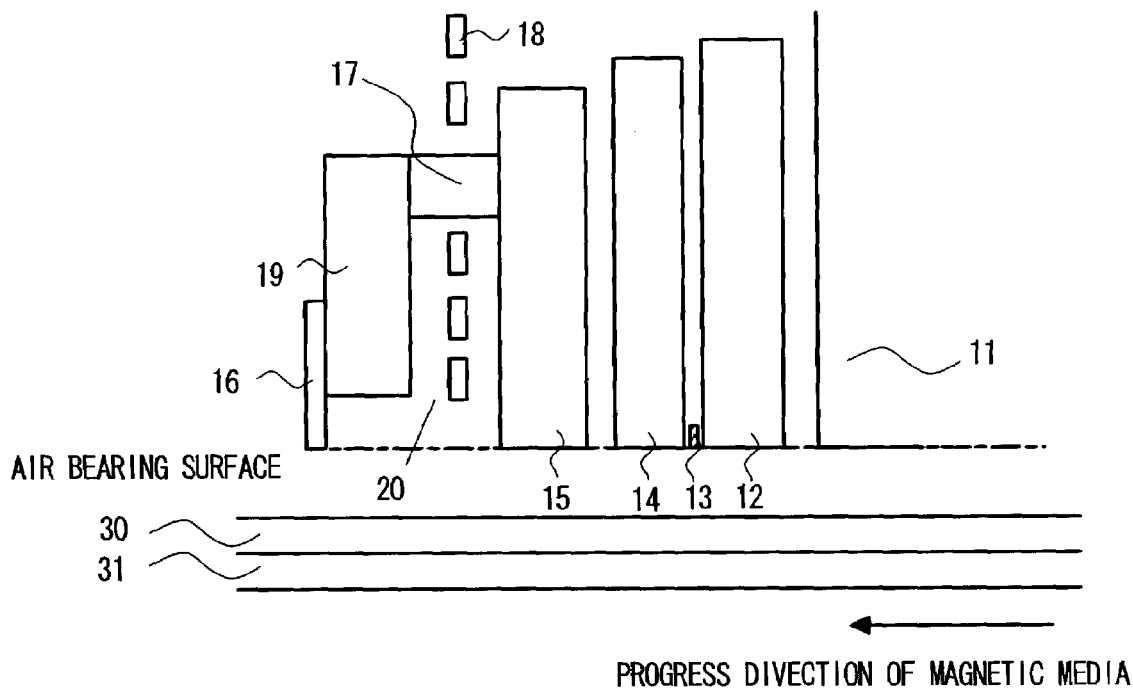
FIG. 6 is a sectional view of the magnetic head according to the present invention.
Figure 7:
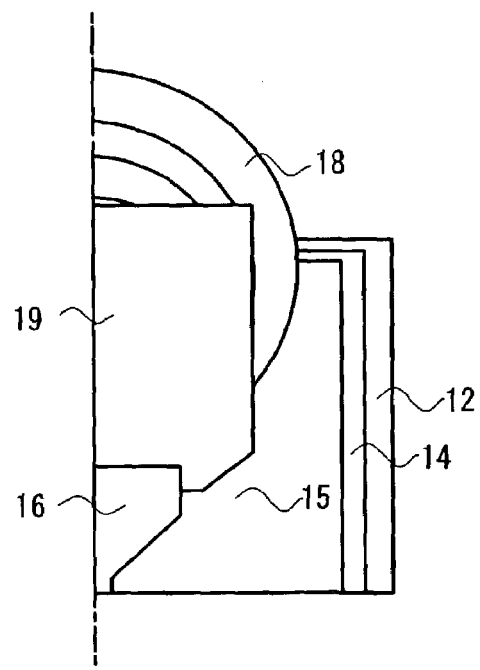
FIG. 7 is a schematic diagram showing the magnetic head according to the present invention.

This example demonstrates the magnetic head whose structure is shown in FIGS. 6 and 7. FIG. 6 is a sectional view perpendicular to the air bearing surface and the substrate surface. FIG. 7 is a plan view showing the structure of the magnetic head (right half). This plan view is perpendicular to the air bearing surface and the substrate surface. The magnetic head in this example differs from the one shown in FIG. 2 in that the main magnetic pole is formed at the trailing side of the yoke. This structure facilitates connection between the main magnetic pole and the yoke. Moreover, the magnetic head in this example is characterized in that there exists the following relationship among the saturation magnetic flux density $B_s(P_1)$ of the material contained in the main magnetic pole 16, the saturation magnetic flux density $B_s(P_2)$ of the material constituting the yoke 19, the average film thickness $t_1$ of the magnetic body constituting the main magnetic pole 16, and the average film thickness $t_2$ of the yoke 19.

$$B_s(P_1) \times t_1 \leq B_s(P_2) \times t_2$$

If this condition is not met, there will be a large magnetic field leakage from the yoke, and this deteriorates the characteristic properties of the head.

Figure 8A:
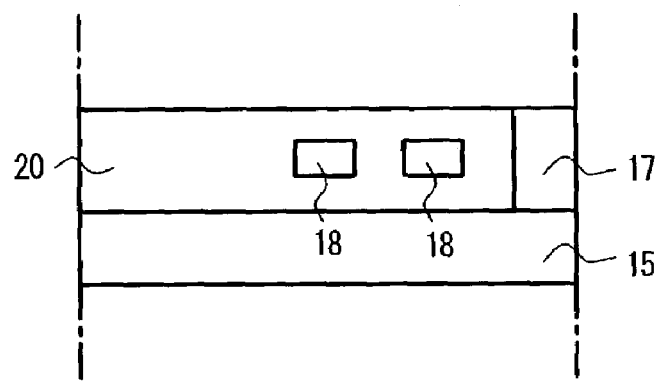
FIG. 8A is a schematic diagram showing the process for producing the magnetic head according to the present invention.
Figure 8B:
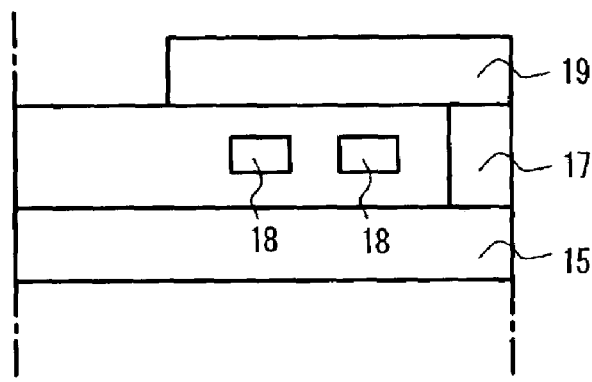
FIG. 8B is a schematic diagram showing the process for producing the magnetic head according to the present invention.
Figure 8C:
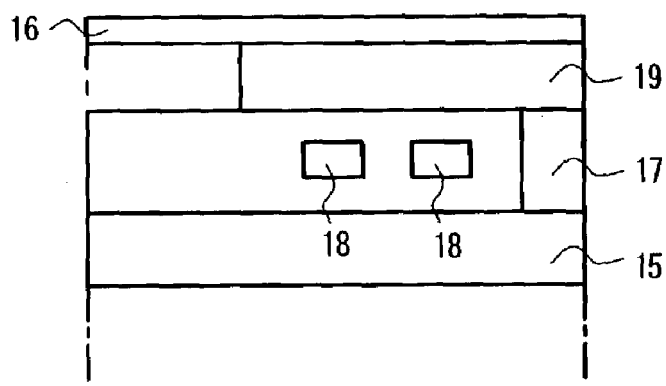
FIG. 8C is a schematic diagram showing the process for producing the magnetic head according to the present invention.
Figure 8D:
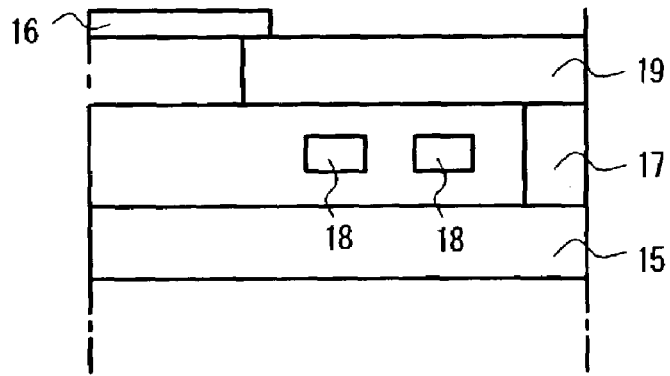
FIG. 8D is a schematic diagram showing the process for producing the magnetic head according to the present invention.

The magnetic head in this example is formed by the process schematically shown in FIGS. 8A to 8D (with the reproducing part omitted). The first step shown in FIG. 8A is intended to form the secondary magnetic pole 15, the coil 18, the insulating film 20 to support the coil, and the yoke 17. The first step is completed by chemical-mechanical polishing (CMP) for planarization. The back yoke 17 is made of NiFe. In the second step shown in FIG. 8B, the yoke 19 is formed by electroplating in the same way as in Example 1, and planarization by CMP is repeated. In the third step shown in FIG. 8C, a 0.2 μm thick film is formed from CoNiFe or FeCo having a $B_s$ larger than 2.0 T. In the fourth step shown in FIG. 8D, the main magnetic pole is formed in a desired shape by photolithography and ensuing ion milling. The main magnetic pole 16 formed in this manner has a part which increases in width in the track width direction. The position of this part is closer to the flying surface than the side of the flying surface of the yoke.

Incidentally, although the main magnetic pole in this example was formed by pattering (ion milling) a sputtered film, it is also possible to form it in a desired shape by plating using a resist frame.

EXAMPLE 3

Figure 9:
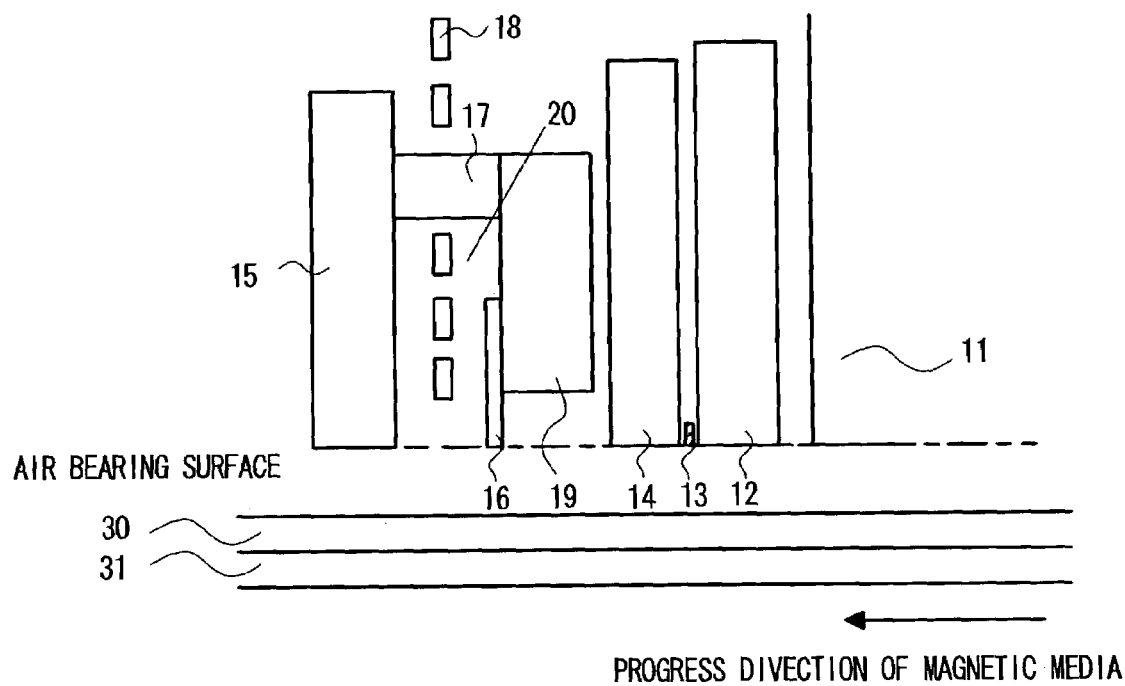
FIG. 9 is a schematic diagram showing the magnetic head according to the present invention.

This example demonstrates the magnetic head whose structure is shown in FIG. 9. FIG. 9 is a sectional view perpendicular to the air bearing surface and the substrate surface. The magnetic head in this example is characterized in that the main magnetic pole 16 and the yoke 19 are formed between the secondary magnetic pole 15 and the upper shield and the main magnetic pole is close to the trailing side of the yoke. Arranging the main magnetic pole, secondary magnetic pole, and yoke in this manner makes the recording magnetic pole and the reproducing magnetic pole close to each other, thereby improving the characteristic properties of the head.

After the reproducing element has been formed, the yoke 19 is formed (with the gap film attached thereto) by electroplating in the same way as in Example 1. Electroplating is followed by CMP for planarization. A 0.2 μm thick film is formed from CoNiFe or FeCo having a $B_s$ larger than 2.0 T. The main magnetic pole in a desired shape is formed from this film by photolithography and ensuing ion milling. The main magnetic pole 16 formed in this manner has a part which increases in width in the track width direction. The position of this part is closer to the flying surface than the side of the flying surface of the yoke. A protective film is formed from alumina. Then, the coil 18, the insulating film 20 to support the coil, and the back yoke 17 are formed. After planarization by CMP, the secondary magnetic pole 15 is formed.

EXAMPLE 4

Figure 10:
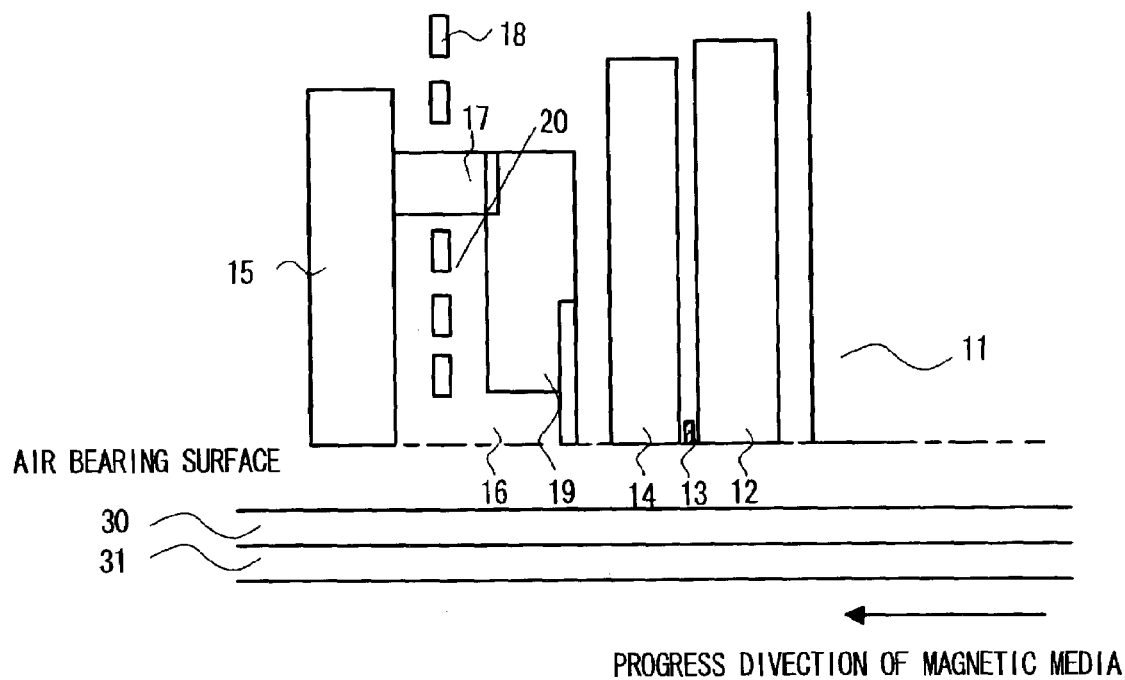
FIG. 10 is a schematic diagram showing the magnetic head according to the present invention.

This example demonstrates the magnetic head whose structure is shown in FIG. 10. FIG. 10 is a sectional view perpendicular to the air bearing surface and the substrate surface. The magnetic head in this example is characterized in that the main magnetic pole 16 and the yoke 19 are formed between the secondary magnetic pole 15 and the upper shield and the main magnetic pole is close to the trailing side of the yoke. Arranging the main magnetic pole, secondary magnetic pole, and yoke in this manner makes the recording magnetic pole and the reproducing magnetic pole close to each other, thereby improving the characteristic properties of the head.

After the reproducing element has been formed, the main magnetic pole 16 is formed (with the gap film attached thereto). The main magnetic pole 16 is formed by laminating alternately magnetic films and non-magnetic films. After fabrication into a desired shape, a protective film of alumina is formed. The yoke 19 is formed by electroplating in the same way as in Example 1. Electroplating is followed by CMP for planarization. The main magnetic pole 16 formed in this manner has a part which increases in width in the track width direction. The position of this part is closer to the flying surface than the side of the flying surface of the yoke. A protective film is formed from alumina. Then, the coil 18, the insulating film 20 to support the coil, and the back yoke 17 are formed. After planarization by CMP, the secondary magnetic pole 15 is formed.

EXAMPLE 5

This example demonstrates a magnetic head in which of the main magnetic pole is composed of magnetic layers and non-magnetic layers laminated one over another. The adjacent layers in the magnetic pole magnetize in the anti-parallel direction, so that the magnetic pole has reduced remanent magnetization and is less liable to cause erasure after recording.

Figure 11A:
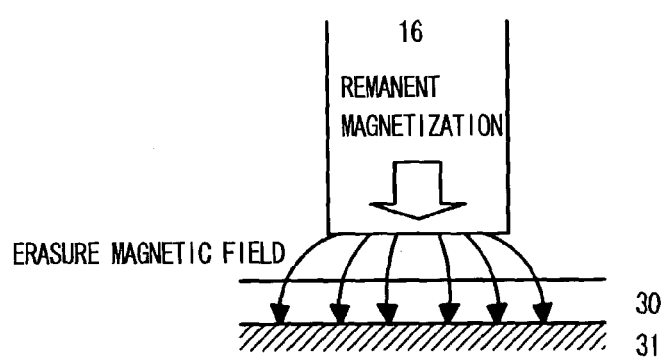
FIG. 11A is a diagram showing how erasure after recording is prevented by the main magnetic pole (in multi-layered film structure) of the magnetic head according to the present invention.
Figure 11B:
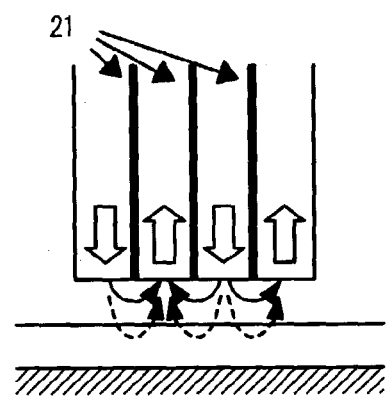
FIG. 11B is a diagram showing how erasure after recording is prevented by the main magnetic pole (in multi-layered film structure) of the magnetic head according to the present invention.

FIGS. 11A and 11B schematically show how erasure after recording decreases in the case where the main magnetic pole is formed from magnetic films and non-magnetic films laminated one over another. As mentioned above, the main magnetic pole is formed from a material having a high saturation magnetic flux density, so that remanent magnetization orients mostly to the flying surface as shown in FIG. 11A. Upon reaching the recording medium, it functions as the erasure magnetic field and causes erasure after recording. The non-magnetic layer interposed between two magnetic layers causes the magnetic layers to produce the static magnetic coupling so that remanent magnetization in the main magnetic pole forms the closed magnetic circuit as shown in FIG. 11B. This reduces the erasure magnetic field which leaks and reaches the recording medium, thereby preventing erasure after recording.

EXAMPLE 6

Figure 12:
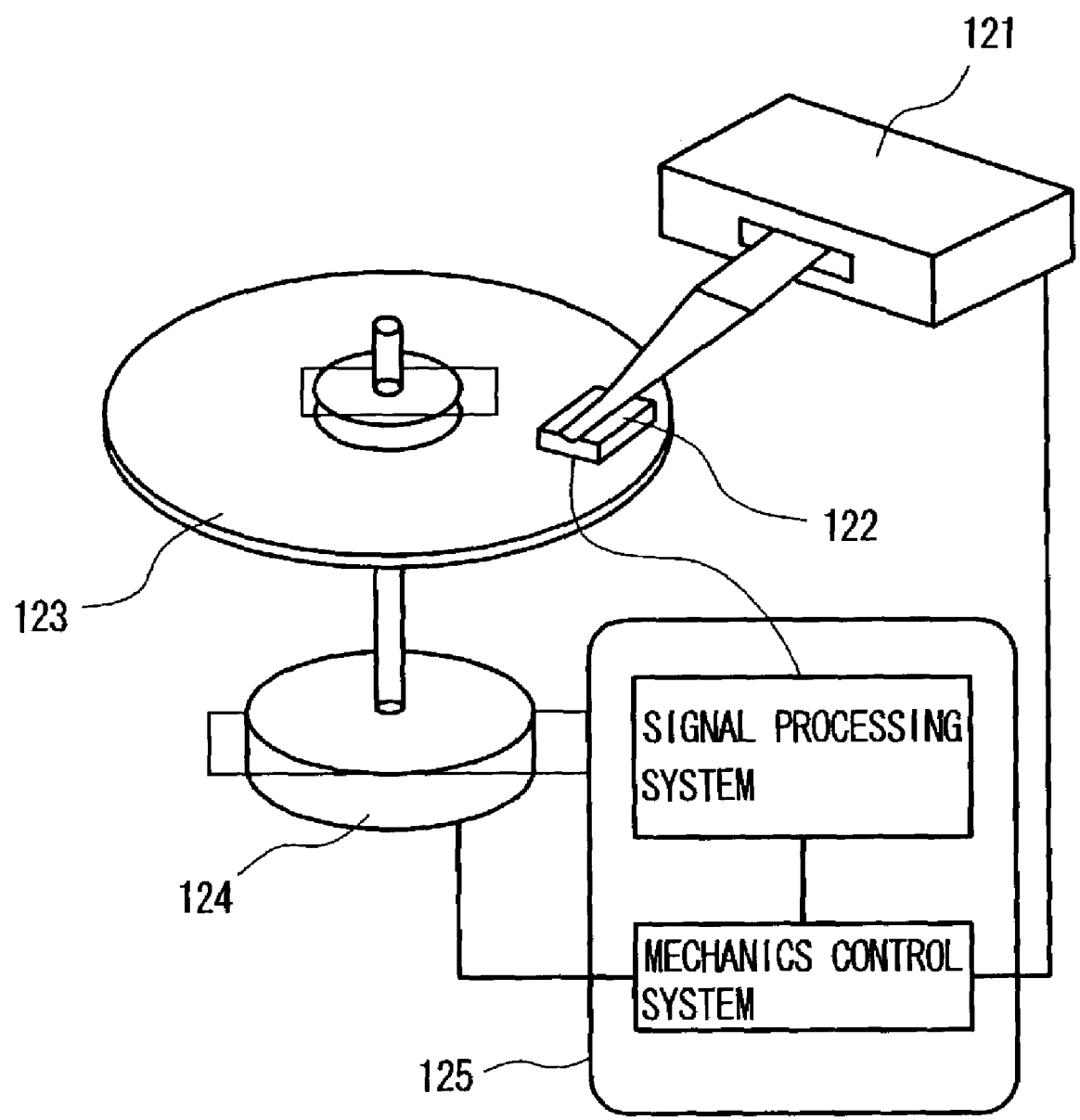
FIG. 12 is a schematic diagram showing the magnetic storage apparatus according to the present invention.

This example demonstrates a magnetic storage apparatus provided with the magnetic head for perpendicular recording which has been produced according to the present invention. As shown in FIG. 12, the magnetic storage apparatus consists of a magnetic recording medium 123 on which information is recorded, a motor 124 to rotate the magnetic recording medium 123, a magnetic head 122 to write and read information to and from the magnetic disc, an actuator 121 to bring the magnetic head 122 to a desired position, and a control system 125. The magnetic recording medium 123 has a soft magnetic underlayer and a recording layer. The magnetic head 122 consists of a main magnetic pole, a yoke which extends in the track width direction more than the main magnetic pole, a secondary magnetic pole which is magnetically coupled with the main magnetic pole and the yoke, a coil to excite the recording magnetic pole, and a flying surface opposite to the magnetic recording medium.

While the magnetic head is floating, it is necessary that the distance between the end of the flying surface side of the yoke and the soft magnetic underlayer of the magnetic recording medium should be sufficiently larger than the distance between the end of the flying surface side of the main magnetic pole and the soft magnetic underlayer of the magnetic recording medium. Otherwise, a magnetic field leaks from the yoke, thereby preventing writing to a desired track. Therefore, it is necessary to make larger the distance between the end of the flying surface side of the yoke and the soft magnetic underlayer of the magnetic recording medium than the distance between the end of the flying surface side of the main magnetic pole and the soft magnetic underlayer of the magnetic recording medium.

EXAMPLE 7

A magnetic storage apparatus which comprises a magnetic recording medium having a soft magnetic underlayer and a recording layer, a magnetic head having the flying surface opposite to said magnetic recording medium, and a means to keep said magnetic head at a prescribed floating height with respect to said magnetic recording medium, wherein said magnetic head has a recording magnetic pole, a secondary magnetic pole magnetically coupled with said recording magnetic pole, and a coil to excite said recording magnetic pole, said recording magnetic pole has a main magnetic pole and a yoke extending in the track width direction and contains a material having a higher saturation magnetic flux density than that of said yoke, and said main magnetic pole and said yoke respectively have a positive and a negative magnetostriction constant.

EXAMPLE 8

The magnetic storage apparatus as mentioned in Example 7 which is characterized in that while the magnetic head is floating, the distance between the end of the flying surface side of the yoke and the soft magnetic underlayer of the magnetic recording medium is ten times as large as the distance between the end of the flying surface side of the main magnetic pole and the soft magnetic underlayer of the magnetic recording medium.

EXAMPLE 9

The magnetic storage apparatus as mentioned in Example 7 which is characterized in that the main magnetic pole of the magnetic head has a multi-layered film composed of magnetic films and non-magnetic films alternately laminated one over another and the thickness of the magnetic film contained in the main magnetic pole is smaller than twice the distance between the end of the flying surface side of the main magnetic pole and the soft magnetic underlayer constituting the magnetic recording medium, when measured when the magnetic head is floating.

EXAMPLE 10

The magnetic storage apparatus as mentioned in Example 7 in which the magnetic head further comprises a reproducing part having a magnetoresistive effect element.

As apparent from the above-foregoing, the magnetic head for perpendicular recording according to the present invention is characterized in that the main magnetic pole and the yoke are separate from each other and the main magnetic pole is formed from a material with a high saturation magnetic flux density and the yoke is formed from a material with a negative magnetostriction constant. In addition, the main magnetic pole is formed from magnetic films and non-magnetic films laminated one over another. This structure reduces remanent magnetization in the main magnetic pole. In this way the present invention realizes a magnetic head for perpendicular recording which is less liable to cause erasure after recording and a magnetic storage apparatus provided with said magnetic head.

What is claimed is:

1. A magnetic head of the type having a recording magnetic pole, a secondary magnetic pole magnetically coupled with said recording magnetic pole, and a coil to excite said recording magnetic pole, wherein said recording magnetic pole comprises a main magnetic pole and a yoke extending in the track width direction, and the main magnetic pole contains a material having a higher saturation magnetic flux density than said yoke, and said main magnetic pole and said yoke respectively have a positive and a negative magnetostriction constant, wherein the main magnetic pole has a positive magnetostriction constant and the yoke has a negative magnetostriction constant.

2. The magnetic head according to claim 1, wherein the main magnetic pole is composed of multi-layered film formed by laminating alternately magnetic films and non-magnetic films.

3. The magnetic head according to claim 1, wherein the main magnetic pole has a part which continuously increases in width from the flying surface side in the track width direction, and the position of such a part is closer to the edge than the side of the flying surface of the yoke.

4. The magnetic head according to claim 1, wherein the yoke has a soft magnetic film containing an alloy composed of $(78+x)$ wt % of Ni and $(22-x)$ wt % of Fe, where $0<x<20$.

5. The magnetic head according to claim 1, wherein there exists the following relationship among the saturation magnetic flux density $B_s(P_1)$ of the main magnetic pole, the saturation magnetic flux density $B_s(P_2)$ of the yoke, the average film thickness $t_1$ of the main magnetic pole, and the average film thickness $t_2$ of the yoke, where $B_s(P_1) \times t_1 \leq B_s(P_2) \times t_2$.

6. The magnetic head according to claim 1, wherein the main magnetic pole has a part continuously increasing from the flying surface side in the track width direction such that $L_y \leq T_w$, where $L_y$ denotes the distance from the flying surface to the position where the width begins to increase in the track width direction, and $T_w$ denotes the track width of the main magnetic pole on the flying surface.

7. The magnetic head according to claim 1, wherein the main magnetic pole has a part continuously increasing from the flying surface side in the track width direction such that $L_y \leq t_1$, where $L_y$ denotes the distance from the flying surface to the position where the width begins to increase in the track width direction, and $t_1$ denotes the average film thickness of the magnetic body constituting the main magnetic pole.

8. The magnetic head according to claim 1, wherein the main magnetic pole is formed at the leading side of the yoke.

9. The magnetic head according to claim 1, wherein the main magnetic pole is formed at the trailing side of the yoke.

10. The magnetic head according to claim 1, which further comprises a reproducing part having a magnetoresistive effect element.

11. The magnetic head according to claim 2, which further comprises a reproducing part having a magnetoresistive effect element.

12. The magnetic head according to claim 3, which further comprises a reproducing part having a magnetoresistive effect element.

13. The magnetic head according to claim 4, which further comprises a reproducing part having a magnetoresistive effect element.

14. The magnetic head according to claim 5, which further comprises a reproducing part having a magnetoresistive effect element.

15. The magnetic head according to claim 6, which further comprises a reproducing part having a magnetoresistive effect element.

16. The magnetic head according to claim 7, which further comprises a reproducing part having a magnetoresistive effect element.

17. The magnetic head according to claim 8, which further comprises a reproducing part having a magnetoresistive effect element.

18. The magnetic head according to claim 9, which further comprises a reproducing part having a magnetoresistive effect element.

* * * * *